Figure 1:
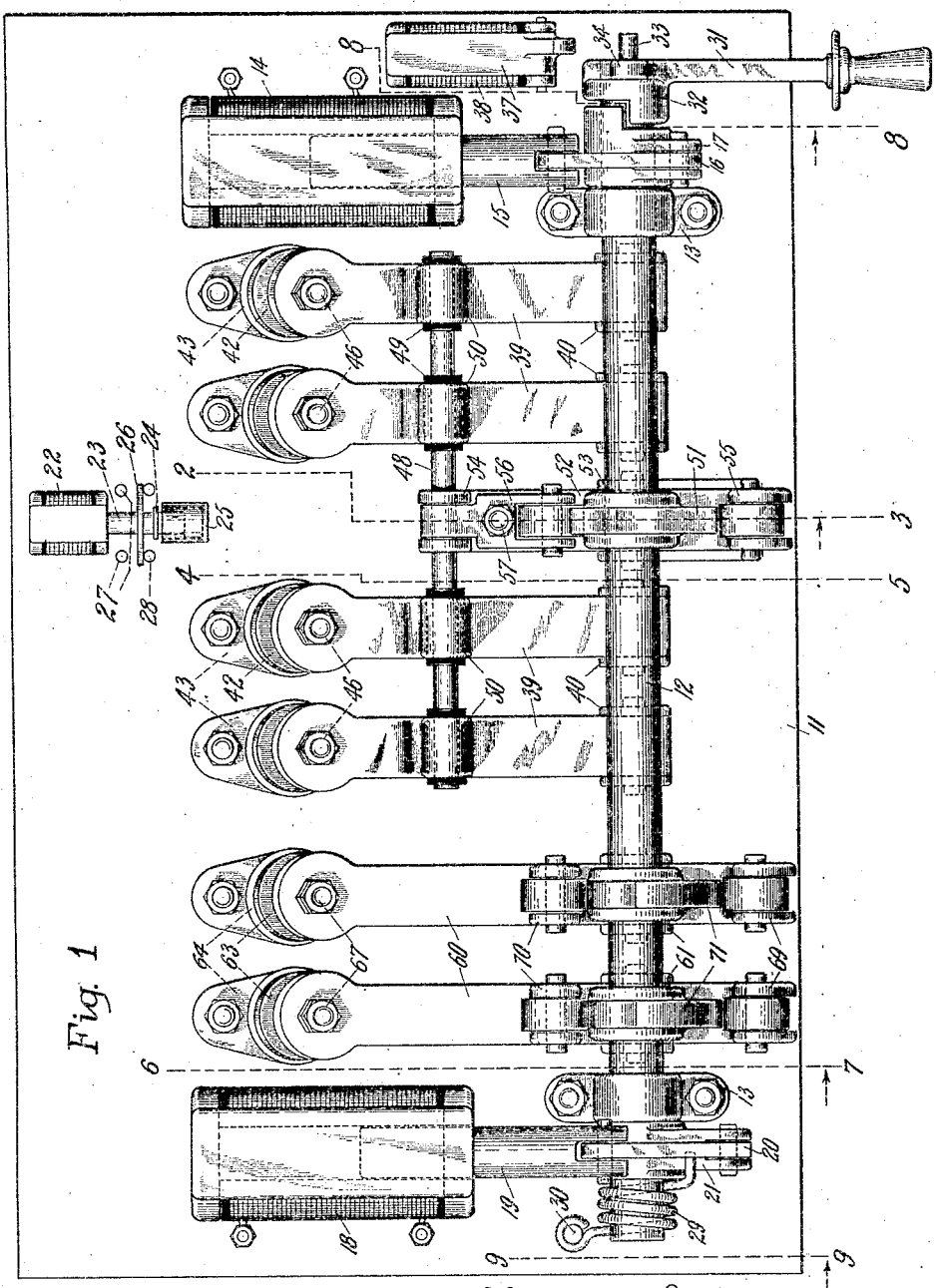
Figure 2:
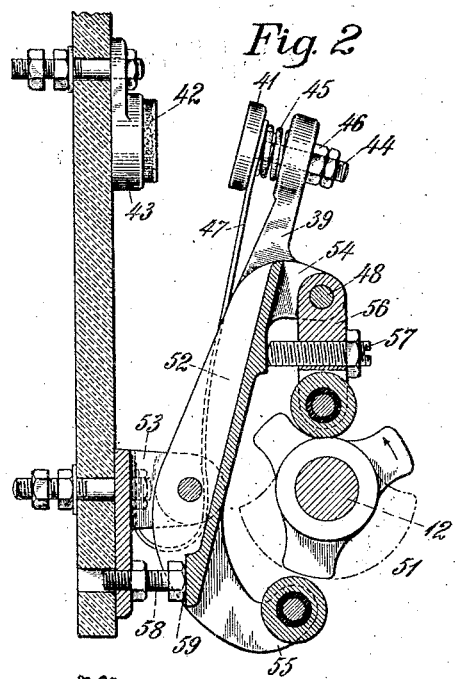
Figure 3:
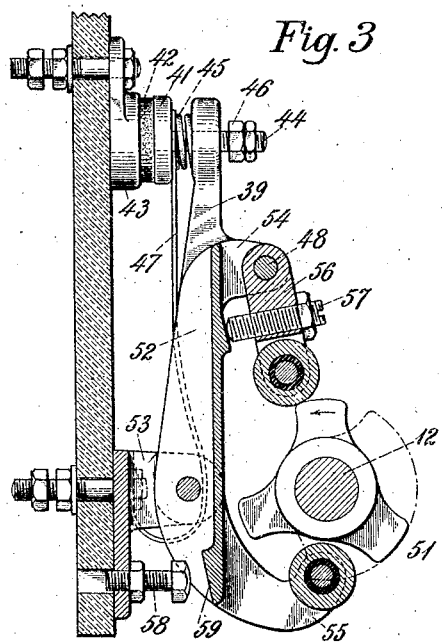
Figure 4:
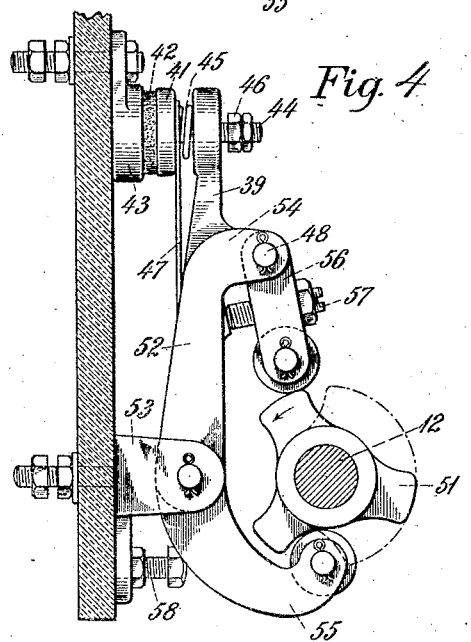
Figure 5:
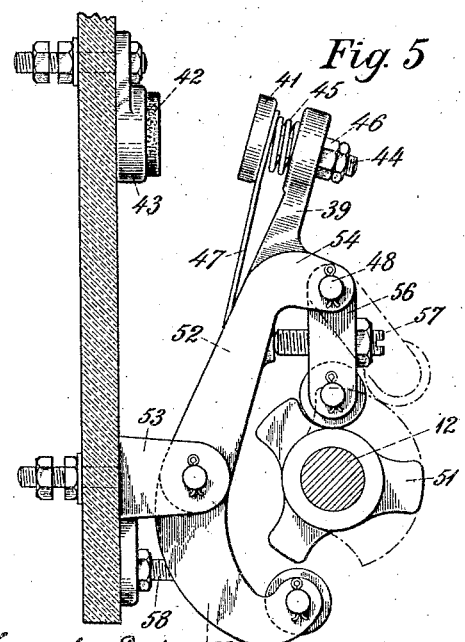

F. W. SMITH, L. LARSEN & B. PEARSON.
ELECTRIC CONTROLLER.
APPLICATION FILED JULY 27, 1916.

1,292,381.

Patented Jan. 21, 1919.
4 SHEETS—SHEET 2.

Frank W. Smith
Louis Larsen
Bernhard Pearson
INVENTORS

BY Wm. B. Whitney
ATTORNEYS.

F. W. SMITH, L. LARSEN & B. PEARSON.
ELECTRIC CONTROLLER.
APPLICATION FILED JULY 27, 1916.

1,292,381.

Patented Jan. 21, 1919.
4 SHEETS—SHEET 3.

Frank W. Smith
Louis Larsen
Bernhard Pearson

INVENTORS

BY Wm B. Whitney
ATTORNEYS.

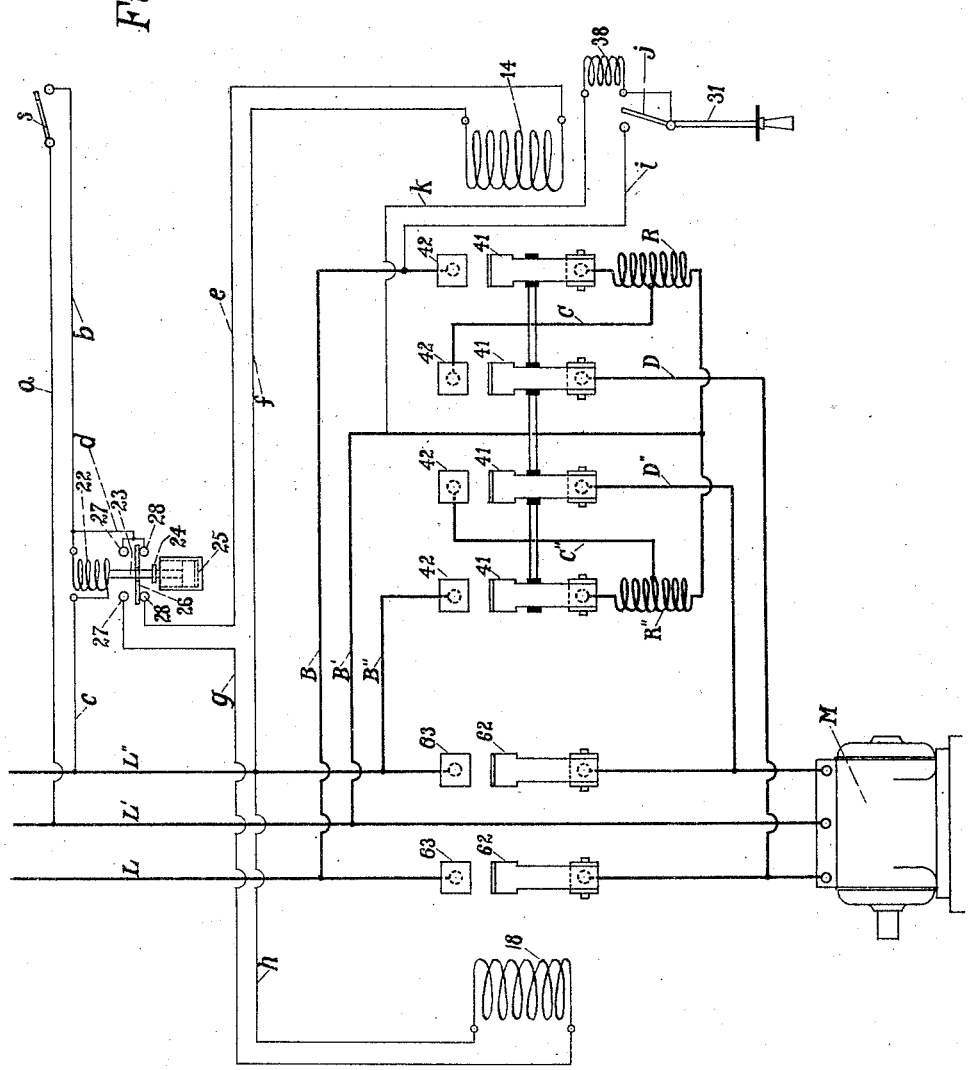

UNITED STATES PATENT OFFICE.

FRANK W. SMITH, OF WESTFIELD, NEW JERSEY, LOUIS LARSEN, OF BROOKLYN, NEW YORK, AND BERNHARD PEARSON, OF EMERSON, NEW JERSEY, ASSIGNORS TO SUNDH ELECTRIC COMPANY, OF NEW YORK, N. Y., A CORPORATION OF NEW YORK.

ELECTRIC CONTROLLER.

1,292,381.            Specification of Letters Patent.      Patented Jan. 21, 1919.

Application filed July 27, 1916. Serial No. 111,570.

*To all whom it may concern:*

Be it known that we, FRANK W. SMITH and LOUIS LARSEN, citizens of the United States, residing, respectively, at Westfield, in the county of Union and State of New Jersey, and in the city of New York, borough of Brooklyn, county of Kings, and State of New York, and BERNHARD PEARSON, a subject of the King of Sweden, residing at Emerson, in the county of Bergen and State of New Jersey, have jointly invented certain new and useful Improvements in Electric Controllers, of which the following is a specification.

Our invention relates to an electric controller which, although by no means limited in its use thereto, is particularly adapted to effect the successive circuit connections of an alternating-current motor of the type which is started with an inductive resistance to suitably regulate the potential of its current supply.

Motors of this type are supplied with current at a reduced voltage for starting and at a higher or full voltage for running, and such regulation of potential is commonly effected by connecting the motor to the supply wires either first through transformer windings and then directly or through what are known as delta and star connections or successively through fuses of different sizes. Whichever means are employed, however, it is essential that the switch or group of switches which is actuated to make each of the different connections shall be again actuated to break that connection before the next switch or group of switches is actuated to make the succeeding connection.

The object of our invention is to provide a controller, manually operated or automatic as may be desired, which is capable of successively making and breaking circuit connections of the character mentioned and which is both simple in construction and efficient and reliable in operation.

With this end in view the invention comprises, broadly considered, a plurality of switches which are normally held in open position and a cam mechanism which is adapted, by actuation in one direction only, to close and open first one switch or group of switches and then another in succession and finally to close the last switch or group of switches and which, on being released, will be returned to its original or starting position, opening the last, without actuating the preceding, switch or group of switches. It also includes the novel features of construction, arrangement, and combination of parts hereinafter fully described and particularly pointed out in the appended claims, for all the uses to which they may be adapted.

One specific form of our invention, as embodied in a combined automatic and manual controller for a three-phase induction motor is shown, for purposes of illustration merely, in the accompanying drawings, in which—

Figure 6:
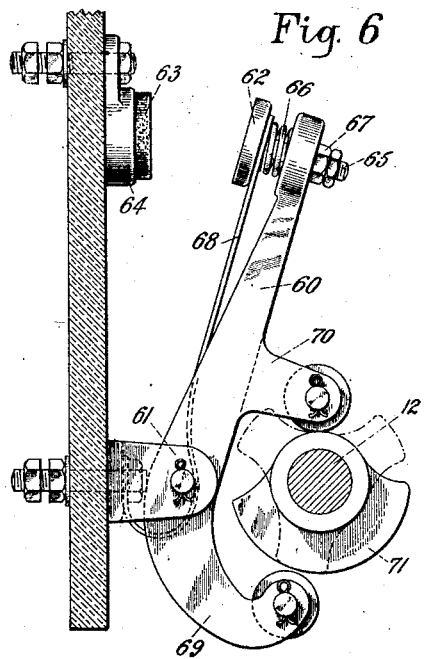
Figure 7:
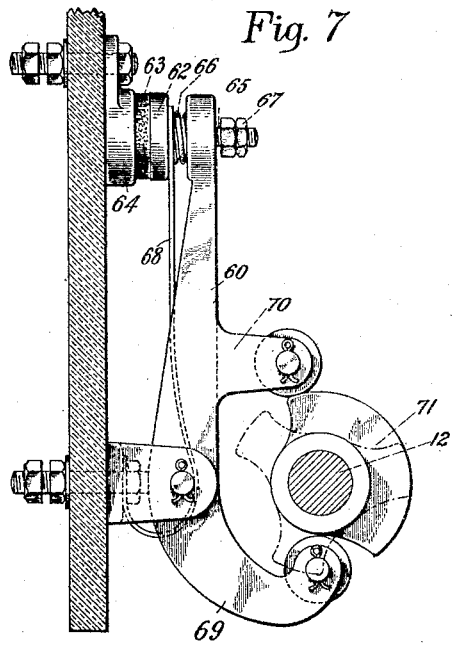
Figure 8:
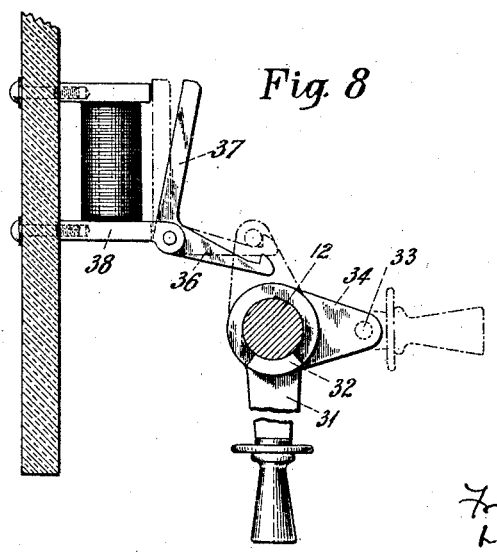
Figure 9:
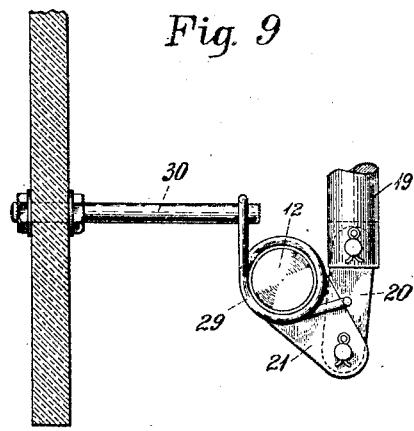

Figure 1 is a view of the front of the controller panel, showing the switches and switch-actuating mechanism in front elevation; Figs. 2, 3, 4, and 5, detail views, partly in section the two former on the line 2 3 and the two latter on the line 4 5 of Fig. 1, showing in different positions the actuating mechanism for the four switches which make the starting connections of the motor and the upper end of one of these switches; Figs. 6 and 7, detail views, partly in section on the line 6 7 of Fig. 1, showing in different positions one of the two switches which make the running connections of the motor; Fig. 8, a broken detail, in section on the line 8 8 of Fig. 1, showing the lever provided for the manual operation of the controller and the locking mechanism therefor; Fig. 9, a broken detail, in section on the line 9 9 of Fig. 1, showing the end of the cam-shaft and certain parts connected thereto; and Fig. 10, a diagrammatic view of the switches and the circuit connections.

The same reference characters are used to indicate like parts throughout the several figures of the drawings.

As here illustrated the controller comprises, briefly, a cam-shaft, a group of four switches which are simultaneously actuated by a single cam on the shaft to make the starting connections of the motor, a second group of two switches which are simultaneously actuated each by an individual cam on the shaft to make the running connections of the motor, two solenoids which are controlled by a relay and are adapted to rock the cam-shaft, one to the extent required to close the normally open starting switches and the other to the further extent required to open the starting and close the running switches, and a hand-lever by which the cam-shaft may be rocked manually to effect the switching operations performed automatically by the solenoids.

Referring to the drawings, 11 is the usual supporting-plate, of slate or other non-conducting material, upon which the operative parts of the controller are mounted. The cam-shaft 12 is journaled in suitable bearings 13 bolted to the supporting-plate. The solenoid 14, secured by its frame on the supporting-plate, is connected at the lower end of its core or plunger 15 by the pivoted link 16 to the rock-arm 17 mounted upon and to rotate with the cam-shaft. The second solenoid 18 is similarly mounted upon the supporting-plate and similarly connected at the lower end of its plunger 19 by the pivoted link 20 to the rock-arm 21 also mounted upon and to rotate with the cam-shaft. The connections of the first solenoid with the cam-shaft are such as to allow the shaft to be further rocked by the second solenoid after the plunger of the first has reached the limit of its upward movement. The circuits of the windings of the two solenoids are controlled by a suitable relay, which, as here shown, is mounted upon the face of the supporting-plate and comprises a solenoid 22, a plunger 23 therefor which carries a collar 24 and to the lower end of which is attached a piston (shown only in dotted lines), working in a dash-pot 25, and a bridging-contact 26 loosely mounted upon the plunger of the solenoid and adapted to successively engage and bridge a lower pair of contacts 27 27 and an upper pair of contacts 28 28. The spring 29, which is coiled around an end of the cam-shaft and bears at one end against the upper side of the rock-arm 21 and at the other end is attached to a post 30 mounted on the supporting-plate, is put under tension when the cam-shaft is rocked by the solenoids and assists in restoring the shaft to normal position when the windings of the solenoids are deënergized.

The hand-lever 31, which is loosely mounted upon the cam-shaft adjacent the rock-arm 17, is provided on one side with a laterally-projecting radial shoulder 32 and on the other side with an oppositely-projecting pin 33 set in the outer end of a projecting lug 34. The shoulder on the hand-lever coöperates with a corresponding shoulder 35 on the adjacent rock-arm, and the pin is adapted to be engaged, when the hand-lever is swung forwardly and upwardly, by a latch-hook 36 projecting outwardly from the pivoted lower end of the armature 37 of a no-voltage release magnet 38 mounted on the face of the supporting-plate.

Each of the four starting switches, which are alike and may be of any suitable construction, comprises as shown a switch-arm 39 which is pivotally mounted at its lower end in a bracket 40 secured to the face of the supporting-plate by a bolt of conducting material serving at the back of the plate as a binding-post for a circuit wire and carries at its upper end a contact 41, usually of copper, and, coöperating with this movable contact, a fixed carbon contact 42 which is mounted in a block 43 of suitable conducting material secured in like manner to the face of the supporting-plate by a bolt serving at the back as a binding post for a second circuit wire. The movable contact is yieldingly mounted on the switch-arm, in one of the common ways, by means of a stem 44 which passes loosely through an opening provided therefor in the upper end of the switch-arm and is surrounded by a compression spring 45 normally holding the contact at a distance from the switch-arm limited by a nut 46 on the threaded end of the stem, and is electrically connected with the lower binding-post by a connector-strip 47 of low resistance. The movable members of these four switches are operatively connected together, by a rod 48 which passes through insulating bushings 49 set in the outer ends of lugs 50 projecting one from the front of each switch-arm, and with a three-pointed star cam 51 mounted on the cam-shaft, by means of an actuating-arm 52 which intermediate its ends is pivotally mounted, coaxial with the pivotal bearings of the four switch-arms, in a bracket 53 secured to the face of the supporting-plate and through the upper end 54 of which, curved outwardly opposite and to an extent corresponding to that of the lugs on the switch-arms, the rod 48 passes. The cam acts upon the actuating-arm both at its upper and lower ends, on the downwardly and outwardly curved lower end 55 directly, on the usual anti-friction roller mounted therein, and on the upper end through a member 56 which at its upper end is pivoted upon the rod 48, within the forked end of the actuating-arm, and is provided with an adjustable set screw 57 limiting its backward movement with respect to the actuating-arm. The outward or forward movement of the upper end of the actuating-arm, and of the several switch-arms, is limited by a set-screw 58 which is adjustably set in the base of the bracket 53 and against the outer end of which a seat 59 on the actuating-arm is adapted to bear.

The two running switches, which like the starting switches are alike and may be of any suitable construction, each comprises as shown a switch-arm 60 which intermediate its ends is pivotally mounted in a bracket 61 secured to the face of the supporting-plate and carries at its upper end the usual copper contact 62, and, coöperating with this movable contact, a fixed carbon contact 63 which is mounted in a block 64 of conducting material secured to the face of the supporting-plate. As in the case of the starting switches, the movable contact of each running switch is mounted on the switch-arm by means of a stem 65 which passes loosely through an opening provided therefor in the upper end of the switch-arm and is yieldingly held by a compression spring 66 at a distance therefrom limited by a nut 67 on the threaded end of the stem and the bolts by which both the bracket supporting the switch-arm and the block supporting the fixed contact are secured to the supporting-plate provide binding-posts on the back thereof for the circuit wires. The movable contact is electrically connected with the lower binding-post by a connector-strip 68. The switch-arm of each switch is provided with anti-friction bearing surfaces both at its curved lower end 69 and at the outer end of a lug 70 projecting from the face thereof above its pivotal bearing, which are alternately engaged by a cam 71 mounted on the cam-shaft.

The operation of the controller, constructed as above described and connected up in the electrical circuits illustrated in Fig. 10 of the drawings, is as follows: The operative parts of the controller are normally held in the position in which they are shown in Figs. 1, 2, 6, and 10, in which position the starting and running switches are all locked in open position and the motor M, being disconnected from the two outer line-wires L and L'', is at rest. The motor is or may be started, from a distance, by closing the switch $s$, which for convenience is shown as a simple hand-switch but may be of any of the well-known automatic types—a float or pressure-controlled switch, for example. On the closing of this switch control-circuits are simultaneously completed through the windings of the solenoid 14 and the solenoid 22 of the relay current flowing from the line-wire L' over the wires $a$ and $b$ and thence both through the solenoid winding 22 over wire $c$ to the line-wire L'' and over the wire $d$, contacts 28 and bridging contact 26 and wire $e$ through the solenoid winding 14 and over the wire $f$ back to the line-wire L''. The solenoid 14 being thus energized draws up its plunger instantaneously and rocks the cam-shaft from the position shown in Figs. 2 and 6, where the arcual end of one arm of the cam 51 bears against the lower end of the actuating-arm of the starting switches and the cams 71 bear against the lower ends of the movable arms of the running switches, thereby holding them locked in open position, to the position shown in Fig. 3, during which movement the arm of the cam 51 passes from engagement with the lower end of and releases the actuating-arm and a second arm engages the pivoted member 56 and thereby first closes and then holds in closed position the four starting switches. This connects the outer line-wires L and L'' to the intermediate wire L' through the two outer switches and the transformer windings R and R'' and to the motor through the outer switches, portions of the transformer windings and the intermediate switches, thus starting the motor with a reduced voltage in two of its three phases. The solenoid of the relay acts more slowly, the upward movement of its plunger being retarded by the dash-pot, until, after a time interval dependent upon the regulation of the dash-pot, the collar on the plunger engages the bridging-contact of the device and then, the dash-pot being preferably vented at this point, raises the bridging-contact from the lower contacts 28 against the upper contacts 27, thereby opening the circuit through the winding of the solenoid 14 and completing a circuit through the winding of the solenoid 18—from the line-wire L' over the wires $a$, $b$, $d$, contact-points 27 and bridging-contacts 26, and wires $g$ and $h$ to line-wire L''. The solenoid 18 thereupon raises its plunger instantaneously and thereby further rocks the cam-shaft, in the same direction as that in which it was rocked by the solenoid 14, through the intermediate positions shown in Figs. 4 and 5 to the final position shown in Fig. 7, during which further movement the second arm of the cam 51 first passes from its engagement with the pivoted member of the actuating-arm of the starting switches, which thereupon kick open, then the third arm of this cam engages the lower end of the actuating arm and locks the four starting switches in open position and finally the cams 71, which up to this point have been holding the two running switches locked in open position, pass out of engagement with the lower ends of the switch-arms and throw these two switches to and hold them locked in closed position. The connections of the line-wires L and L'' with the motor through the transformer windings are thus first broken and then these wires are connected directly to the motor, supplying current thereto at full potential. On the opening of the switch $s$, or on failure of current on the line-wires, the two main solenoids, as well as the solenoid of the relay, are deenergized and release their plungers, which by gravity, aided by the spring 29, previously put in tension by the rocking of the cam-shaft, rock the cam-shaft back to its initial or normal position. During this reverse movement of the cam-shaft, the cams 71 first open and then lock in open position the two running switches, while the cam 51, after swinging outwardly the member 56 pivoted to the actuating-arm of the already open starting switches (see dotted lines, Fig. 5,) without disturbing those switches, again locks them in open position.

When it is desired to operate the controller manually, the hand-lever 31 is raised and rocks the cam-shaft to first close and then open the starting switches and finally to close the running switches. The raising of the hand-lever also closes a switch $j$ in a control-circuit, from line-wire L over the wires B and $i$ and back over the wires $k$ and B' to the line-wire L', through the winding of the magnet 38, so that, when the hand-lever has been raised to the limit of its upward movement, the magnet, being energized, attracts its armature and brings the latch-hook 36 into engagement with the pin 33 (see dotted lines, Fig. 8), locking the parts in running position. The motor is stopped by pressing the latch-hook out of engagement with the pin, whereupon the hand-lever is unlocked and drops and the cam-shaft is rocked back by the spring 29, previously put in tension, to disconnect the motor and restore the parts to normal starting position; and a like result is obtained when, upon failure of current on the line-wires, the magnet is deënergized and releases its armature.

Our new controller is not only simple in construction but is efficient and reliable in operation. The mechanism for successively effecting the different electrical connections by a movement of the actuating means in one direction only will be found advantageous, especially in a hand starter. It is also to be noted that both the closing and, what is of more importance, the opening of the several switches is made positively and quickly. The starting switches will open with a kick, since the lower end of the pivoted member of the actuating arm will fly out and instantly release them, no matter how slowly the cam-shaft is being rocked, as soon as the peak of the cam passes the center of the friction-roller thereon; and, when the cam-shaft is finally released, the coiled spring wound about it will cause the cams to strike the roller bearings on the lower ends of the arms of the running switches a blow which, aided by a kick-off from the resilient mounting of their contacts, will open these switches with a snap. Furthermore, whether open or closed, the switches are interlocked and so safeguarded at all times against accidental movement.

While we have illustrated and described what we now consider to be the best mode in which to apply the principle of our invention for the particular purpose in view, it is to be understood that the several parts of the device may be variously modified in form, location, and arrangement, or equivalents substituted therefor, or that certain parts can be omitted entirely, without departing from the spirit or sacrificing the advantages thereof. It is obvious, for example, that the starting switches may be arranged to be operated each by a separate cam and that the running switches may be operated by a single cam through an actuating arm; also that the number of switches in each group may be varied and additional switches or groups of switches introduced. Such other modifications may also be made as come within the scope of the claims.

What we claim as new, and desire to secure by Letters Patent, is—

1. In an electric circuit controller, the combination of a plurality of switches and mechanism normally locking the switches in one position and adapted to release and actuate certain of the switches successively and in so doing to positively return each switch so actuated to and lock it in its original position before actuating another switch.

2. In an electric circuit controller, the combination of a plurality of switches, mechanical means adapted to actuate certain of said switches successively and to positively return each switch so actuated to its original position before actuating another switch and to hold it locked in such position while actuating the succeeding switches, and electromagnetic means adapted to automatically control the operation of said mechanical means.

3. In an electric circuit controller, the combination of a plurality of switches and a cam mechanism which normally locks the switches in one position and is adapted by movement in one direction to release and actuate certain of said switches successively and in so doing positively returns each switch except the last so actuated to its original position while actuating another switch and again locks it in such position.

4. In an electric circuit controller, the combination of a plurality of switches and cam mechanism adapted to actuate certain of said switches successively and to return each switch so actuated to its original position before another switch is fully actuated while at all times positively controlling the position of the switches.

5. In an electric circuit controller, the combination of a plurality of switches, cam mechanism adapted by movement in one direction to actuate said switches successively and to return each switch except the last so actuated to and lock it in its original position before actuating the next switch and by movement back to its initial starting position to return the switch last actuated to and lock it in its original position without actuating the preceding switches, means for actuating the cam mechanism in the said first direction, and means adapted to return the cam mechanism to its original starting position on the release of the actuating means.

6. In an electric circuit controller, the combination of a plurality of switches and a cam mechanism which is electromagnetically actuated to a limited extent in one direction and is adapted during such movement to successively actuate certain of said switches and to return each switch except the last so actuated to its original position while actuating another switch and on release by the actuating means to return to its starting position and in so doing to restore the switch last actuated to its original position.

7. In an electric circuit controller, the combination of a plurality of switches, cam mechanism adapted on movement in one direction to successively actuate certain of said switches returning each switch except the last so actuated to its original position before actuating the next, electromagnetic means for actuating said cam mechanism, and a timing device for introducing a time interval between the actuation and the return to normal position of a switch.

8. In an electric circuit controller, the combination of a plurality of switches and an electromagnetically controlled cam mechanism adapted on movement in one direction to actuate certain of said switches successively and to return each switch except the last so actuated to normal position before actuating another switch and on movement back to its original position to return the switch last actuated to normal position without actuating the other switches.

9. In an electric circuit controller, the combination of a plurality of switches, cam mechanism adapted on movement in one direction to actuate certain of said switches successively, returning each switch except the last so actuated to normal position before actuating the next switch, and on movement in the reverse direction to return to normal position the switch last actuated and return to its original position without actuating the preceding switches, electromagnetic means for actuating the cam mechanism in the said first direction, a timing device for controlling the cam-actuating means to introduce a time interval between the actuation and return to normal position of a switch, and means for restoring the cam mechanism to its original position on the release of the cam actuating means.

10. In an electric circuit controller, the combination of a plurality of switches and an automatically actuated cam mechanism normally locking said switches in open position and adapted on movement in one direction to close said switches successively, opening and locking in open position each switch so closed before closing the next switch, and on movement in the reverse direction to open the switch last closed and return to its original position without closing the switches previously opened.

11. In an electric circuit controller, the combination of a plurality of switches, an oscillating cam mechanism adapted on movement in one direction to close said switches successively opening each switch except the last so closed before closing the next, electromagnetic means adapted to automatically control the operation of the cam mechanism, and a timing device adapted to control the electromagnetic means to introduce a time interval between the closing and the opening of a switch.

12. In a controller for regulating the potential of alternating current motors, the combination of two groups of switches, cam mechanism adapted normally to hold both groups of switches locked in open position and on movement in one direction only to first close and then open and lock in open position one group of switches and finally to close the second group of switches, means for actuating the cam mechanism to effect the said switch operations, and means adapted on release of the actuating means to return the cam mechanism to its original starting position.

13. In a controller for regulating the potential of alternating current motors, the combination of two groups of switches, cam mechanism normally holding both groups of switches locked in open position and adapted on movement in one direction to first close and then open and lock in open position one group of switches and finally to close the second group of switches and on movement back to its original starting position to open the second without closing the first group of switches, means for actuating the cam mechanism in the said first direction, and means for returning the cam mechanism to its original starting position on the release of the actuating means.

14. In a controller for regulating the potential of alternating current motors, the combination of two groups of switches, cam mechanism adapted normally to hold both groups of switches locked in open position and on movement in one direction to first close and then open and lock in open position one group of switches and finally to close the second group of switches, and two solenoids adapted to effect the said movement of the cam mechanism one to the extent required to close the first group of switches and the other to continue the movement to open the first group and close the second group of switches.

15. In a controller for regulating the potential of alternating current motors, the combination of two groups of switches, a cam mechanism adapted normally to lock both groups of switches in open position and on movement in one direction to first close and then open and lock in open position the first group of switches and finally to close the second group of switches, two solenoids operatively connected to the cam mechanism and adapted one to effect the said movement thereof to the extent required to close the first group of switches and the other to complete the said movement thereof, and a relay adapted to control the actuating circuits of the two solenoids and to introduce a time interval between the actuation of the first and the actuation of the second.

16. In a controller for regulating the potential of alternating current motors, the combination of two groups of switches, cam mechanism normally holding both groups of switches open and adapted on movement in one direction to first close and then open one group of switches and then to close the second group of switches and on movement in the other direction to open the second group of switches and return to its original position without closing the first group of switches, means both automatic and manual for actuating the cam mechanism in the said first direction, and means adapted to restore the cam mechanism to its original position on the release of the actuating means.

17. In a controller for regulating the potential of alternating current motors, the combination of two groups of switches, cam mechanism normally holding both groups of switches open and adapted on movement in one direction to first close and then open one group of switches and then to close the second group of switches and on movement in the other direction to open the second group of switches and return to its original position without closing the first group of switches, electromagnetic means for actuating the cam mechanism in the said first direction, a timing device for controlling the said cam actuating means to introduce a time interval between the closing and the opening of the first group of switches, and means adapted to restore the cam mechanism to its original position on the release of the cam actuating means.

18. The combination, with a polyphase induction motor and supply wires one of which is permanently connected thereto, of a controller comprising two groups of switches, one group of switches adapted both to connect the other supply wires to the supply wire permanently connected to the motor through transformer coils and to the motor through a portion of said transformer coils and the other group of switches adapted to connect said other supply wires to the motor directly, and means for first closing and then opening and locking in open position the switches of the first group while holding the switches of the second group locked in open position and finally closing the latter switches.

19. In combination, a plurality of electric switches, a cam-shaft carrying cams arranged in operative relationship with the movable arms of the switches to actuate certain of said switches successively, and two solenoids operatively connected to the cam-shaft and adapted when energized to rock said shaft one solenoid to the extent required for the actuation of one switch and the other solenoid to the further extent required for the actuation of another switch.

20. In combination, a plurality of electric switches, a cam-shaft carrying cams arranged thereon in operative relationship with the movable members of the switches, two solenoids operatively connected to the cam-shaft and adapted when energized to rock said shaft one to a certain extent and the other to a further extent in the same direction, and a time relay adapted to control the circuits of the two solenoids and to introduce a time interval between the energization of one and the energization of the other.

21. In combination, a plurality of normally open electric switches, a cam mechanism provided with cam surfaces adapted on movement in a single direction to first close certain of the switches and then to open the switches so closed and finally to close certain other of the switches, two solenoids operatively connected with the cam-mechanism and adapted one to operate the cam mechanism to the extent required to close the first mentioned switches and the other to the further extent required to open the switches so closed and to close the other switches, a time relay device adapted to control the operation of the solenoids and to introduce a time interval between the operation of one and the operation of the other, a hand-lever adapted to operate the cam mechanism to actuate the said switches, and means including a no-voltage release magnet adapted to engage the hand-lever and hold the cam mechanism in the position to which it has been moved by the hand-lever.

22. An electric switch comprising fixed and movable contacts, a supporting arm for the movable contact, a cam, and an operative connection between the cam and the said arm whereby the cam on movement in one direction will first move and then release the arm and on movement in the opposite direction will not affect the arm.

23. An electric switch comprising fixed and movable contacts, a supporting arm for the movable contact, and a cam operatively related to the said arm and adapted when in one position to lock the switch in open position and on a limited movement from said position in one direction to first close the switch and then open and lock it in open position and to return to said first position without closing the switch.

24. An electric switch comprising fixed and movable contacts, a pivoted supporting arm for the movable contact, and a cam, the said arm being provided on one side of its pivotal bearing with a relatively fixed bearing surface for engagement by the cam and on the other side of its pivotal bearing with a pivotally mounted bearing surface for engagement by the cam limited in its movement toward the arm but adapted to swing freely away therefrom.

25. An electric switch comprising fixed and movable contacts, a pivoted actuating arm for the movable contact provided with two bearings for a cam, one a relatively fixed bearing on one side of its pivotal support and on the other side of said support a second bearing pivoted to swing outwardly from but limited in its movement toward the actuating arm, and a cam adapted to engage and release alternately said fixed and swinging bearings on the actuating arm.

26. An electric switch comprising fixed and movable contacts, an actuating arm for the movable contact tending normally to hold said contact away from the fixed contact, a member so pivotally mounted on the actuating arm that it is free to swing outwardly from but is stopped in its movement toward the arm, and a cam adapted on movement in one direction only to first press the said pivoted member toward the actuating arm and thereby to force the arm to move the movable into engagement with the fixed contact to close the switch and then to release the said pivoted member and allow it to swing outwardly from the arm.

27. An electric switch comprising as elements thereof a movable switch member normally biased to open position, a cam, and an operative connection between the cam and the switch-arm provided by a member pivotally mounted on the back of the movable member and stopped in its movement toward but free to swing away from the movable member.

28. In combination, a plurality of movable switch arms, an actuating arm operatively connected to said switch arms, and a cam adapted on movement in a single direction to engage said actuating arm to first actuate said switch arms and then to return them to normal position and then to return itself to original position without actuating the said switch arms.

29. In combination, a plurality of switches including movable switch arms normally biased to open position, an actuating arm operatively connected to said switch arms, and a cam operatively related to the actuating arm and, acting thereon, adapted normally to lock the switch arms in open position and on movement in one direction to first move the switch arms to closed position and then to release and lock them in open position and to return to its original position without moving the switch arms.

30. An electric switch comprising fixed and movable contacts, a pivoted supporting arm for the movable contact provided with bearing surfaces on opposite sides of its pivotal bearing, and an actuating cam mounted independently of the supporting arm and adapted to operatively engage the bearing surfaces thereon alternately, releasing one immediately before engaging the other.

31. An electric switch comprising fixed and movable contacts, a pivoted actuating arm for the movable contact provided with bearing surfaces on opposite sides of its pivotal bearing, and an actuating cam normally in engagement with one bearing surface only and adapted to engage the bearing surfaces alternately, releasing one immediately before engaging the other.

32. An electric switch comprising fixed and movable contacts, a pivoted actuating arm for the movable contact provided with bearing surfaces on opposite sides of its pivotal bearing, and an actuating cam normally engaging one of the bearing surfaces and adapted on movement in one direction to release the first and then to engage the second bearing surface and then to release the second and reëngage the first bearing surface.

33. An electric switch comprising fixed and movable contacts, a pivoted actuating arm for the movable contact provided with bearing surfaces on opposite sides of its pivotal bearing, and an actuating cam, the several parts being so arranged that the cam on movement in one direction will operatively engage the bearing surfaces alternately, releasing one immediately before engaging the other, and on movement in the opposite direction will operatively engage only one of the bearing surfaces.

34. In combination, a plurality of electric switches making butt contact and an oscillating cam mechanism comprising a shaft and a plurality of cams adapted to close certain of said switches successively, to open each switch so closed before closing another switch, and to lock in open position all switches except the switch then being actuated.

35. In combination, a plurality of electric switches making butt contact, an oscillating cam mechanism comprising a shaft and a plurality of cams adapted to close certain of said switches successively, to open each switch so closed before closing another switch, and to lock in open position all switches except the switch being actuated, and electromagnetic means adapted to automatically control the operation of the cam mechanism.

36. In combination, a plurality of electric switches making butt contact, an oscillating cam mechanism comprising a shaft and a plurality of cams adapted to close certain of said switches successively, to open each switch so closed before closing another switch, and to hold locked in open position all switches except the switch being actuated, electromagnetic means adapted to automatically control the operation of the cam mechanism, and a timing device adapted to control the electromagnetic means to introduce a time interval between the closing and opening of a switch.

37. In combination, a plurality of electric switches, mechanism adapted to actuate the switches successively and in so doing to return each switch so actuated to its original position before actuating another switch, and a timing device adapted to control the switch actuating mechanism only between the actuation and the return to its original position of a switch.

38. In combination, a plurality of electric switches, cam mechanism adapted to actuate said switches successively and to return each switch so actuated to its original position before another switch is fully actuated, and a timing device adapted to control the cam mechanism and operative only between the actuation and the return to its original position of a switch.

39. In combination, a plurality of electric switches, an oscillating cam mechanism comprising a shaft and a plurality of cams adapted to close certain of said switches successively, to open each switch so closed before closing another switch, and to lock in open position all switches except the switch being actuated, electromagnetic means adapted to automatically control the actuation of the cam mechanism, and a timing device adapted to control the electromagnetic means and operative only between the closing and opening of a switch.

40. In combination, a plurality of electric switches, cam mechanism adapted by movement in one direction to actuate said switches successively and to return each switch except the last so actuated to and lock it in its original position before actuating the next switch and by movement back to its initial starting position to return the switch last actuated to and lock it in its original position without actuating the preceding switches, means for moving the cam mechanism in both directions, and a timing device operative only to effect a time interval between the actuation and the return to its original position of a switch.

FRANK W. SMITH.
LOUIS LARSEN.
BERNHARD PEARSON.

Copies of this patent may be obtained for five cents each, by addressing the "Commissioner of Patents, Washington, D. C."